United States Patent [19]

Kivi-Mannila et al.

[11] Patent Number: 5,539,750
[45] Date of Patent: Jul. 23, 1996

[54] METHOD FOR RECEIVING A SIGNAL USED IN A SYNCHRONOUS DIGITAL TELECOMMUNICATION SYSTEM

[75] Inventors: Arvi Kivi-Mannila; Esa Viitanen, both of Espoo; Jari Patana, Vantaa; Toni Oksanen, Espoo, all of Finland

[73] Assignee: Nokia Telecommunications OY, Espoo, Finland

[21] Appl. No.: 367,165

[22] PCT Filed: Jul. 1, 1993

[86] PCT No.: PCT/FI93/00279

§ 371 Date: Feb. 14, 1995

§ 102(e) Date: Feb. 14, 1995

[87] PCT Pub. No.: WO94/01947

PCT Pub. Date: Jan. 20, 1994

[30] Foreign Application Priority Data

Jul. 1, 1992 [FI] Finland .................................... 923062

[51] Int. Cl.[6] ........................................................ H04J 3/14
[52] U.S. Cl. ........................................... 370/102; 370/112
[58] Field of Search ................................. 370/84, 110.1, 370/99, 60, 60.1, 66, 67, 94.1, 100.1, 102, 105.1, 112, 58.1, 105.3; 375/372, 371, 363

[56] References Cited

U.S. PATENT DOCUMENTS

| | | | |
|---|---|---|---|
| 4,998,242 | 3/1991 | Upp | 370/60 |
| 5,142,529 | 8/1992 | Parruck et al. | 370/108 |
| 5,210,762 | 5/1993 | Wieber et al. | 371/69.1 |

FOREIGN PATENT DOCUMENTS

| | | |
|---|---|---|
| 0482279 | 4/1992 | European Pat. Off. . |
| 0539758 | 5/1993 | European Pat. Off. . |
| 0548414 | 6/1993 | European Pat. Off. . |

OTHER PUBLICATIONS

CCITT Blue Book, Recommendation G.783, "Characteristics off Synchronous Digital Hierarchy(SCH) Multiplexing Equipment Functional Blocks", Aug. 1990, Annex B, Algorithm for pointer detection, pp. 53–55.
Annex PI to ETS DE/TM1015, ETSI, (European Telecommunications Standards Institute), Jan. 3, 1992, pp. 1–3.
CCITT Blue Book, Recommendation G.709, "Synchronous Multiplexing Structure", Geneva 1989, pp. 131–150.

*Primary Examiner*—Benedict V. Safourek
*Assistant Examiner*—Ajit Patel
*Attorney, Agent, or Firm*—Cushman, Darby & Cushman

[57] ABSTRACT

A method for receiving a signal used in a synchronous digital telecommunication system including a pointer interpretation in which the receiver has three possible main states (NORM, AIS, LOP), between which it undergoes transitions under the control of event counters. In order for fault tolerance to be improved and correction of error situations to be expedited, in the normal state (i) all the events in which the value "normal" (NDF_disabled) of the new data flag is received, and the majority of the I-bits is inverted, and the majority of the D-bits is not inverted are regarded as increment data, and (ii) all the events in which the value "normal" (NDF_disabled) of the new data flag is received, and the majority of the D-bits is inverted, and the majority of the I-bits is not inverted are regarded as decrement data, wherein the value "normal" for the new data flag is considered to be "0110" and values differing therefrom within certain limits.

2 Claims, 6 Drawing Sheets

METHOD FOR RECEIVING A SIGNAL USED IN A SYNCHRONOUS DIGITAL TELECOMMUNICATION SYSTEM

BACKGROUND OF THE INVENTION

The invention relates to a method for receiving a signal used in a synchronous digital telecommunication system.

The current digital transmission network is plesiochronous, that is each 2-Mbit/s basic multiplex system has a dedicated clock independent of any other system. It is therefore impossible to locate a single 2-Mbit/s signal in the bit stream of a higher-order system, but the higher level signal has to be demultiplexed through each intermediate level down to the 2 Mbit/s level to extract the 2-Mbit/s signal. For this reason, especially the construction of branch connections requiring several multiplexers and demultiplexers has been expensive. Another disadvantage of the plesiochronous transmission network is that equipment from two different manufacturers is not usually compatible.

The above drawbacks, among other things, have led to the introduction of the new synchronous digital hierarchy SDH specified in the CCITT recommendations G.707, G.708 and G.709. The synchronous digital hierarchy is based on STM-N transfer frames (Synchronous Transport Modules) located on several levels of hierarchy N (N=1,4,16 . . . ). Existing PCM systems, such as 2, 8- and 32-Mbit/s systems, are multiplexed into a synchronous 155.520-Mbit/s frame of the lowest level of the SDH (N=1). Consistently with the above, this frame is called the STM-1 frame. On the higher levels of hierarchy the bit rates are multiples of the bit rate of the lowest level. In principle, all nodes of the synchronous transmission network are synchronized into one clock. If some of the nodes should, however, lose connection with the common clock, it would lead to problems in the connections between the nodes. The phase of the frame must also be easy to recognize in the reception. For the reasons stated above, a pointer has been introduced in the SDH telecommunications, the pointer being a number which indicates the phase of the payload within the frame, i.e. the pointer indicates that byte in the STM frame from which the payload begins.

FIG. 1 illustrates the structure of an STM-N frame, and FIG. 2 illustrates a single STM-1 frame. The STM-N frame comprises a matrix with 9 rows and N×270 columns so that there is one byte at the junction point between each row and the column. Rows 1–3 and rows 5–9 of the N×9 first columns comprise a section overhead SOH, and row 4 comprises an AU pointer. The rest of the frame structure is formed of a section having the length of N×261 columns and containing the payload section of the STM-N frame.

FIG. 2 illustrates a single STM-1 frame which is 270 bytes in length, as described above. The payload section comprises one or more administration units AU. In the example shown in the figure, the payload section consists of the administration unit AU-4, into which a virtual container VC-4 is inserted. (Alternatively, the STM-1 transfer frame may contain three AU-3 units, each containing a corresponding virtual container VC-3). The VC-4, in turn, consists of a path overhead POH located at the beginning of each row and having the length of one byte (9 bytes altogether), and of the payload section in which there are lower-level frames also comprising bytes allowing interface justification to be performed in connection with mapping when the rate of the information signal to be mapped deviates from its nominal value to some extent. (Mapping of the information signal into the transmission frame STM-1 is described, e.g., in patent applications AU-B-34689/89 and FI-914746.

Each byte in the AU-4 unit has its own location number. The above-mentioned AU pointer contains the location of the first byte of the VC-4 container in the AU-4 unit. The pointers allow positive or negative pointer justifications to be performed at different points in the SDH network. If a virtual container having a certain clock frequency is applied to a network node operating at a clock frequency lower than the above-mentioned clock frequency of the virtual container, the data buffer will be filled up. This requires negative justification: one byte is transferred from the received virtual container into the overhead section while the pointer value is decreased by one. If the rate of the received virtual container is lower than the clock rate of the node, the data buffer tends to be emptied, which calls for positive justification: a stuff byte is added to the received virtual container and the pointer value is incremented by one.

FIG. 3 shows how the STM-N frame can be formed of existing bit streams. These bit streams (1.5, 2, 6, 8, 34, 45 or 140 Mbit/s, shown on the right in the figure) are packed at the first stage into containers C specified by CCITT. At the second stage, overhead bytes containing control data are inserted into the containers, thus obtaining the above-described virtual container VC-11, VC-12, VC-2, VC-3 or VC-4 (the first suffix in the abbreviations represents the level of hierarchy and the second suffix represents the bit rate). This virtual container remains intact while it passes through the synchronous network up to its point of delivery. Depending on the level of hierarchy, the virtual containers are further formed either into so-called tributary units TU or into AU units (AU-3 and AU-4) already mentioned above, by providing them with pointers. The AU unit can be mapped directly into the STM-1 frame, whereas the TU units have to be assembled through tributary unit groups TUG and VC-3 and VC-4 units to form AU units which then can be mapped into the STM-1 frame. In FIG. 3, the mapping is indicated by a continuous thin line, the aligning with a broken line, and the multiplexing with a continuous thicker line.

As is to be seen from FIG. 3, the STM-1 frame may be assembled in a number of alternative ways, and the content of the highest-level virtual container VC-4, for instance, may vary, depending on the level from which the assembly has been started and in which way the assembly has been performed. The STM-1 signal may thus contain, e.g., 3 TU-3 units or 21 TU-2 units or 63 TU-12 units, or a combination of some of the above-mentioned units. As the higher-level unit contains several lower-level units, e.g. the VC-4 unit contains TU-12 units (there are 63 such units in a single VC-4 unit, cf. FIG. 3), the lower-level units are mapped into the higher-level frame by interleaving so that the first bytes are first taken consecutively from each one of the lower-level units, then the second bytes, etc. The example of FIG. 2 shows with circled numbers how the VC-4 unit contains at first consecutively the first bytes of all 63 TU-12 units, then the second bytes of all 63 TU-12 units, etc.

The above-described SDH frame structures and the assembly of such structures have been described, e.g. in References [1] and [2], which are referred to for a more detailed description (the references are listed at the end of the specification).

The above-mentioned pointer mechanism allows flexible phase shift of different units within the STM frame and also reduces the size of buffer memories required in the network. In principle, the SDH system comprises pointers on two levels: AU pointers and TU pointers, which indicate the first byte of a virtual container VC within the AU or TU unit, respectively. The CCITT specifications relating to the pointer are set forth in Reference [1], which is referred to for a more detailed description.

As shown in FIG. 4a, the AU-4 pointer, for example, consists of nine successive bytes H1, Y, Y ... H3, of which the bytes H1 and H2 are shown separately in FIG. 4b. The actual pointer value PTR consists of the ten last bits (bits 7 to 16) of the word formed by bytes H1 and H2. Correspondingly, the value of the TU pointer consists of the ten last bits of the word formed by bytes V1 and V2. The AU and TU pointers have quite similar coding even in other respects; there are, however, some differences, which will be described in the following.

First, the pointer value must be within a certain range in order to be acceptable. The acceptable decimal value of the AU-4 pointer is from 0 to 782, and the acceptable decimal value of the TU-12 pointer, for example, is from 0 to 139. These values are called off-set values, as they (within the frame structure) indicate the offset between the first byte of the pointer and that of the corresponding virtual container. Second, in order for the value "new" for the new data flag (NDF_enable) defined by the N-bits (bits 1 to 4) to be acceptable, three bits should be identical in the AU pointer, and all bits should be identical in the TU pointer. The new data flag NDF allows arbitrary changes in the pointer value if they are the result of a change taking place in the payload. Normal operation (NDF_disabled) is indicated by the N-bit values "0110", and the new pointer value (NDF_enable) by the N-bit values "1001" (i.e. by inverting the bits of the normal state). In this way the new data flag, together with the new pointer value, indicates a change in the alignment of the virtual container within the frame, if the change is caused by some other reason than positive or negative justification (the transmitter may force a new alignment on the virtual container within the frame structure).

If the new data flag indicates a new pointer value (NDF_enable), and the pointer value consists of one bits (i.e. if bits 1 to 16 are "1001SS1111111111" wherein the S-bits may be independently of one another one or zero), it signifies concatenation. Concatenation means that, e.g., AU-4 units are concatenated into one larger unit (so-called AU-4-Xc), which may transfer payloads which require a higher capacity than the C-4 container. (Correspondingly, TU-2 units can be concatenated into a larger unit capable of transferring greater payloads than the capacity of the C-2 container).

If all of the bits 1 to 16 are ones, it signifies alarm (AIS, Alarm Indication Signal).

The S-bits (bits 5 and 6) indicate on which level of hierarchy (shown in FIG. 3; e.g. TU-12) the operation is currently taking place.

The I- and D-bits of the 10-bit pointer word are used to indicate the positive and negative justification described above. If at least three out of five increment bits, or I-bits (bits 7, 9, 11, 13 and 15), are inverted, it signifies positive justification (if certain additional conditions are met). If at least three out of five decrement bits, or D-bits (bits 8, 10, 12, 14, 16), are inverted, it signifies negative justification (if certain additional conditions are met).

In Annex B.1 of CCITT recommendation G.783 (Reference [3]), justification functions are specified as follows:

increment data indicating positive justification inc_ind= norm_NDF+SS+majority of I-bits inverted+no majority of D-bits inverted+the value "new" for the new data flag (NDF_enable), increment data (inc_ind) or decrement data (dec_) has not been received in the three preceding frames, and decrement data indicating negative justification dec_ind= norm_NDF+SS+majority of D-bits inverted+no majority of I-bits inverted+the value "new" for the new data flag (NDF_enable), increment data (inc_ind) or decrement data (dec_) has not been received in the three preceding frames.

In the definition given above, each "+" represents a logical AND function. In addition, the normal NDF (norm_NDF) is defined so that all other bit combinations except the value "new" for the new data flag (NDF_enable) are considered normal.

A condition for the acceptance of justification functions is thus that at least three frames have passed since the previous justification function or since the previous new pointer achieved by means of the the NDF. This is to prevent buffer memory overflow in the receiver.

The original CCITT recommendation has been improved in the new ETSI (European Telecommunication Standards Institute) recommendation (Annex PI to ETS DE/TM1015, 1992) so that in the definitions set forth above, the normal NDF (norm_NDF) has been replaced by the definition disabled_NDF. The justification requests in which two out of four N-bits are erroneous are rejected in the new recommendation.

It has, however, been found to be problematic in the present situation that, e.g., certain errors cannot be corrected rapidly if the existing recommendations are followed. For instance, if two or more justification requests are interpreted during 2 to 4 frames, it is difficult to know which of them was the correct justification request and which one or ones were correspondingly erroneous justification requests due to transmission errors. According to Annex B.1 to recommendation G.783, referred to above, this problem has been solved in such a manner that the first one is always the correct justification request, and the rest are erroneous.

As the SS-bits have, moreover, an effect on the acceptance of a justification request, an error in the transmission of even one of these bits may prevent the performance of a necessary justification function.

An erroneous justification function leads to at least three erroneous frames, during which data is transmitted in an erroneous phase with respect to the pointers. Usually it takes a much longer time before the situation is corrected.

SUMMARY OF THE INVENTION

The object of the present invention is to solve the problem described above and to provide a method by means of which the susceptibility of the system to transmission errors can be reduced and the correction of error situations can be expedited.

The idea of the invention is to accept justification requests without the above-mentioned restriction of the three preceding frames, and also to remove the effect of S-bits on the acceptance of a justification request.

By the method of the invention, the pointer interpretation process effected by the receiver can be implemented in such a manner that transmission errors do not needlessly cause denial of a justification function, which would denote an error situation lasting for several frames.

The solution of the invention has the additional advantage that it reduces the logic needed in a receiver, as it is not necessary to construct a counter which sees to it that the three preceding frames have not included a justification function or a new pointer transmitted by a new data flag.

BRIEF DESCRIPTION OF THE DRAWINGS

In the following, the invention will be described in greater detail by way of example with reference to FIGS. 5 to 7 in the attached drawings, in which.

DETAILED DESCRIPTION

Figure 5:
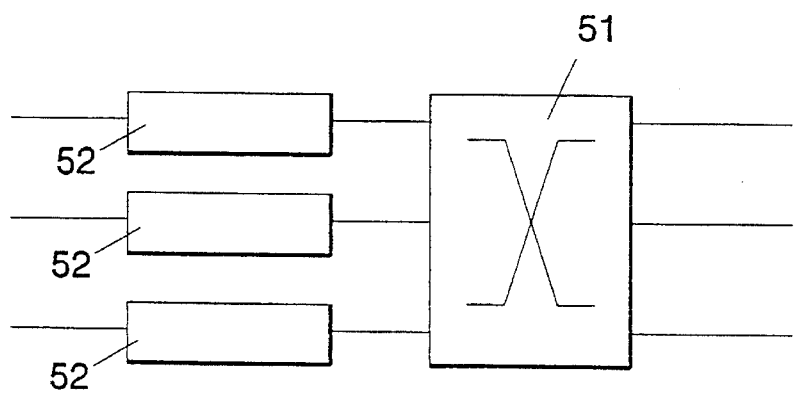

FIG. 5 shows a part of the SDH network in which the method of the invention can be employed. This part is a synchronizing unit 52 of an SDH cross-connect equipment 51. In this synchronizing unit 52, the payload of the signal coming to the cross-connect equipment 51 is stored in an elastic buffer in synchronization with a clock signal extracted from the incoming signal and is read from the elastic buffer in synchronization with the clock signal of the cross-connect equipment. For example, a signal containing 63 TU-12 signals and having the STM-1 frame structure is first applied in the synchronizing unit 52 to a common AU interpretation unit, which interprets the AU pointer data and the H4 byte in the path overhead (POH) of the VC-4 container so as to locate the TU-12 frames included in the frame structure. Thereafter, the interpretation unit forwards the bytes of each one of the TU-12 channels to the dedicated TU interpretation unit, of which there are thus typically 63 in this conventional example. The TU interpretation unit interprets the pointer of each TU-12 channel to determine the phase of the VC-12 signal. The above-mentioned synchronizing unit is described more closely in Finnish Patent Applications No. 922567-922569, which also disclose a solution by means of which 63 parallel interpretation units can be avoided. As the structure of the synchronizing unit does not fall within the scope of the present invention, reference is made to the above-mentioned patent applications for a more detailed description. It should be noted, however, that the method of the invention can be employed in both the known and the new solution which are both disclosed in the above-mentioned applications.

In addition to the synchronizing unit described above, the method of the invention can also be employed in line interfaces of the SDH network, e.g. in a 2 Mbit/s line interface unit, where 2 Mbit/s channels are extracted from the frame structure, or, e.g., in an STM-1 interface unit.

Figure 6:
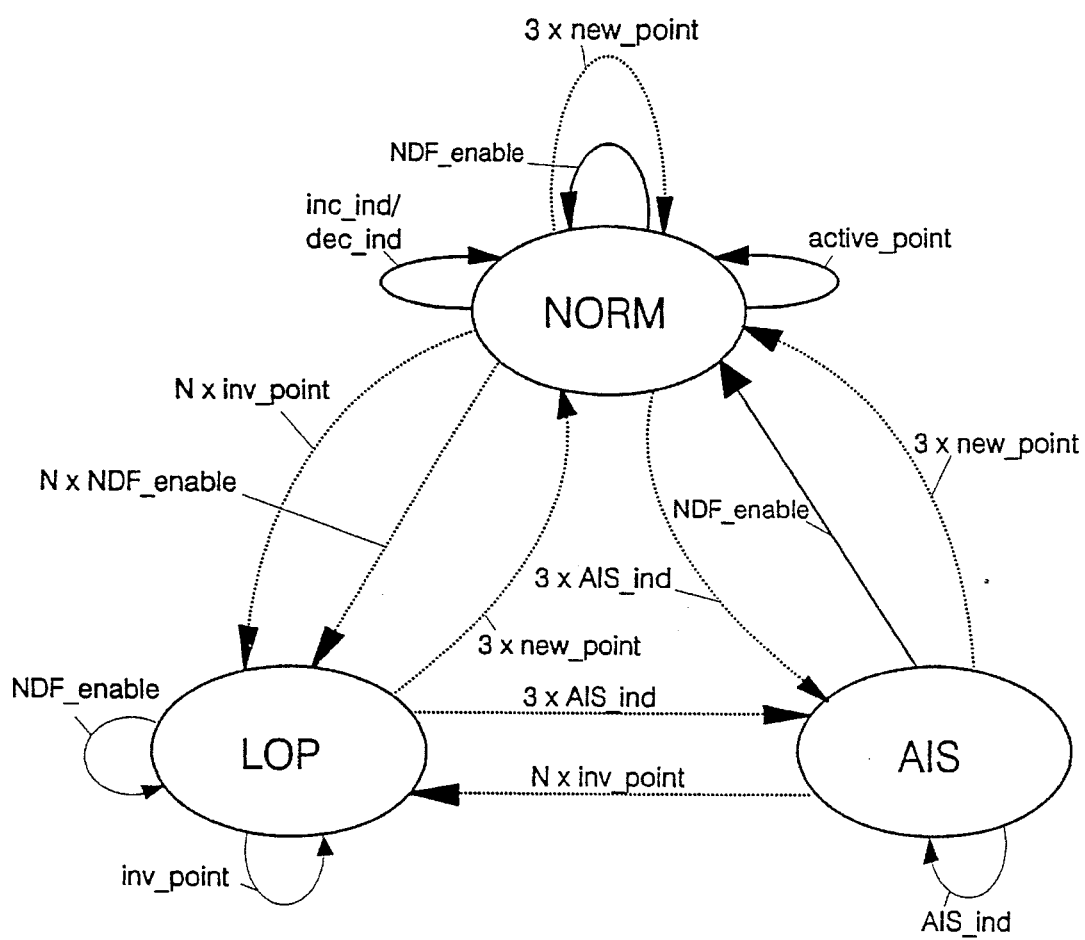
FIG. 6 is a state diagram illustrating the main states of the receiver and transitions taking place in the different states.

The pointer interpretation effected in the receiver can be illustrated according to FIG. 6 as a state diagram in which the interpretation equipment of the receiver has three possible main states: the normal state NORM, the alarm state AIS (Alarm Indication Signal), and the above,described LOP (Loss of Pointer) state. The events possible in these states are thus the result of interpretation of the received pointer and are shown for each state in the following three tables.

| NORM state event | Definition |
| --- | --- |
| active_point (active pointer) | The new data flag (NDF) has the value "normal" (NDF_disabled) and the offset value is within the acceptable range and equal to the valid offset value. |
| new_point (new pointer) | The new data flag has the value "normal" (NDF_disabled) and the offset value is within the acceptable range and unequal to the valid offset value. |
| NDF_enable (new data flag) | The new data flag has the value "new" (NDF_enable),and the offset value is within the acceptable range. |
| AIS_ind (AIS alarm) | The 16-bit pointer word has the value "1111 1111 1111 1111". |
| inc_ind (increment data) | The new data flag has the value "normal" (NDF_disabled), and the majority of I-bits are inverted, and the majority of D-bits are not inverted. |
| dec_ind (decrement data) | The new data flag has the value "normal" (NDF_disabled), and the majority of D-bits are inverted, and the majority of I-bits are not inverted. |
| NORM_inv_point (invalid pointer of the NORM state) | If AIS alarm, the value "new" for the new data flag (NDF_enable) or the active pointer (active_point) is not received. |

| AIS state event | Definition |
| --- | --- |
| active_point (active pointer) | not defined |
| new_point (new pointer) | The new data flag (NDF) has the value "normal" (NDF_disabled), and the offset value is within the acceptable range. |
| NDF_enable (new data flag) | The new data flag has the value "new" (NDF_enable), and the offset value is within the acceptable range. |
| AIS_ind (AIS alarm) | The 16-bit pointer word has the value "1111 1111 1111 1111". |
| inc_ind (increment data) | not defined |
| dec_ind (decrement data) | not defined |
| AIS_inv_point (invalid pointer of the AIS state) | (I) If AIS alarm and the value "new" for the new data flag (NDF_enable) are not received, or (II) if AIS alarm is not received. |

| LOP state event | Definition |
| --- | --- |
| active_point (active pointer) | not defined |
| new_point (new pointer) | The new data flag has the value "normal" (NDF_disabled) and the offset value is within the acceptable range. |
| NDF_enable (new data flag) | The new data flag has the value "new" (NDF_enabled), and the offset value is |

| | within the acceptable range. |
|---|---|
| AIS_ind (AIS alarm) | The 16-bit pointer word has the value "1111 1111 1111 1111". |
| inc_ind (increment data) | not defined |
| dec_ind (decrement data) | not defined |
| LOP_inv_point (invalid pointer of the LOP state) | (I) The counter of the invalid pointer is not updated at all, or (II) all pointer values that are unequal to the AIS alarm, or (III) all pointer values that are unequal to the AIS alarm and the value "new" for the new data flag. |

As can be seen from the above tables, the above-mentioned bytes H1 and H2 (bits 1 to 16) of the pointer can indicate up to seven different events According to the invention, increment data is defined in the normal state so that a situation where the new data flag has the value "normal" (NDF_disabled), the majority of the I-bits are inverted, and the majority of the D-bits are not inverted is considered increment data. Accordingly, a situation where the new data flag has the value "normal" (NDF_disabled), the majority of the D-bits are inverted, and the majority of the I-bits are not inverted is considered decrement data. The values acceptable as the value "normal" for the new data flag will be described below.

Thus, according to the invention, (1) the restriction concerning the three preceding frames has been removed in the acceptance of justification functions, and each accepted justification function is realized, and (2) the effect of the SS-bits on the acceptance of a justification function has been completely removed.

The transition of the receiver between the different main states and to another internal state within a main state is controlled in practice by means of counters as defined in the following table. The index (N or 3) at the beginning of the name of the counter indicates the maximum value of the counter. The counters are modulo counters, i.e. when the value reaches its upper limit, the counter starts over again.

| COUNTER | OPERATION |
|---|---|
| N × NDF_enable (NDF counter) wherein (N= 8...10) | Counts successive NDF_enable events and controls transition from NORM state to LOP state. |
| 3 × new_point (counter of the new pointer) | Counts successive new_point events and controls transition from LOP and AIS states to NORM state, and from NORM state to NORM state (change in the offset value). |
| N × inv_point (counter of an invalid pointer) | Counts successive inv_point events and controls transition from NORM and AIS states to LOP state. |
| 3 × AIS_ind (alarm counter) | Counts successive AIS_ind events and controls transition from NORM and LOP states to AIS state. |

When the counter reaches its maximum value, the following operations are performed in the different states:

1. NORM state

N×NDF_enable: transition to LOP state,

3×new_point: transition to NORM state (change in the offset value),

N×inv_point: transition to LOP state,

3×AIS_ind: transition to AIS state.

2. LOP state

N×NDF_enable: irrelevant,

3×new_point: transition to NORM state,

N×inv_point: irrelevant,

3×AIS_ind: transition to AIS state.

3. AIS state

N×NDF_enable: irrelevant,

3×new_point: transition to NORM state,

N×inv_point: transition to LOP state,

3×AIS_ind: irrelevant.

The offset values of three successive new pointers must be equal, otherwise the counter of the new pointer is reset. In practice, N has a value of from 8 to 10.

If an invalid pointer is received, the counter of the invalid pointer is incremented by one, otherwise the error counter is reset. If the counter of the invalid pointer reaches its maximum value, the LOP state is proceeded to from the normal and alarm state. For example, each justification function (inc_ind or dec_) interpreted in the normal state increments the number of invalid pointers by one in the same way as each new pointer (new_point) interpreted in the normal state.

In FIG. 6, the transitions described above are indicated by broken lines. FIG. 6 also illustrates reception of a single new data flag (together with an acceptable pointer value) in the alarm state, which leads to transition to the normal state NORM. This is the only single event which causes transition from one main state to another.

In addition, FIG. 6 illustrates the changes occurring within the normal state. Such changes are (1) reception of increment or decrement data (inc_ind/dec_ind), and (2) reception of a single new data flag (both of these cause a change in a manner known per se in the offset value in the normal state), and (3) reception of a active pointer (active_point). The figure also illustrates internal changes occurring in the AIS and LOP states.

Figure 7A:
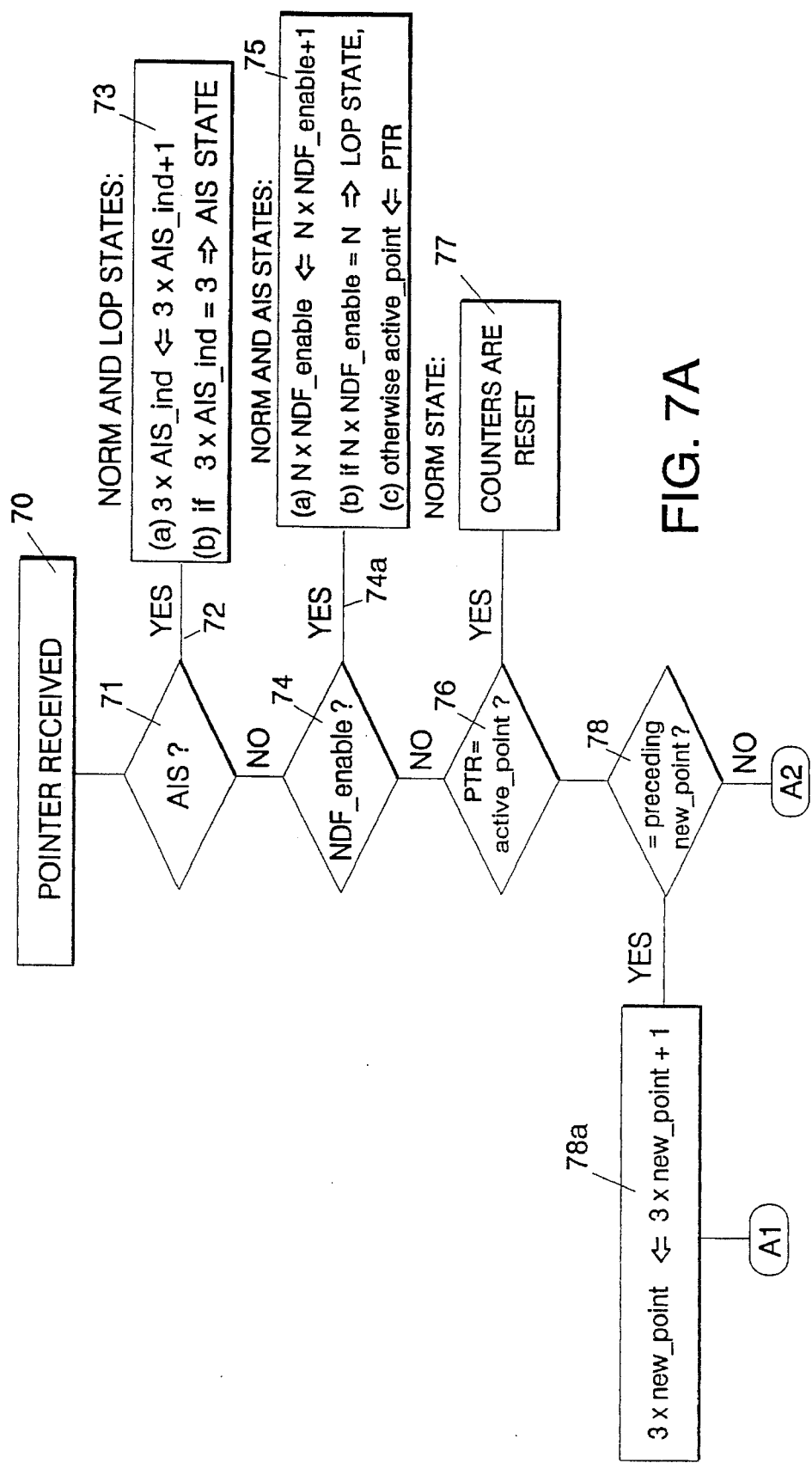
FIGS. 7A and 7B show a flow diagram of the pointer interpretation process of the invention.
Figure 7B:
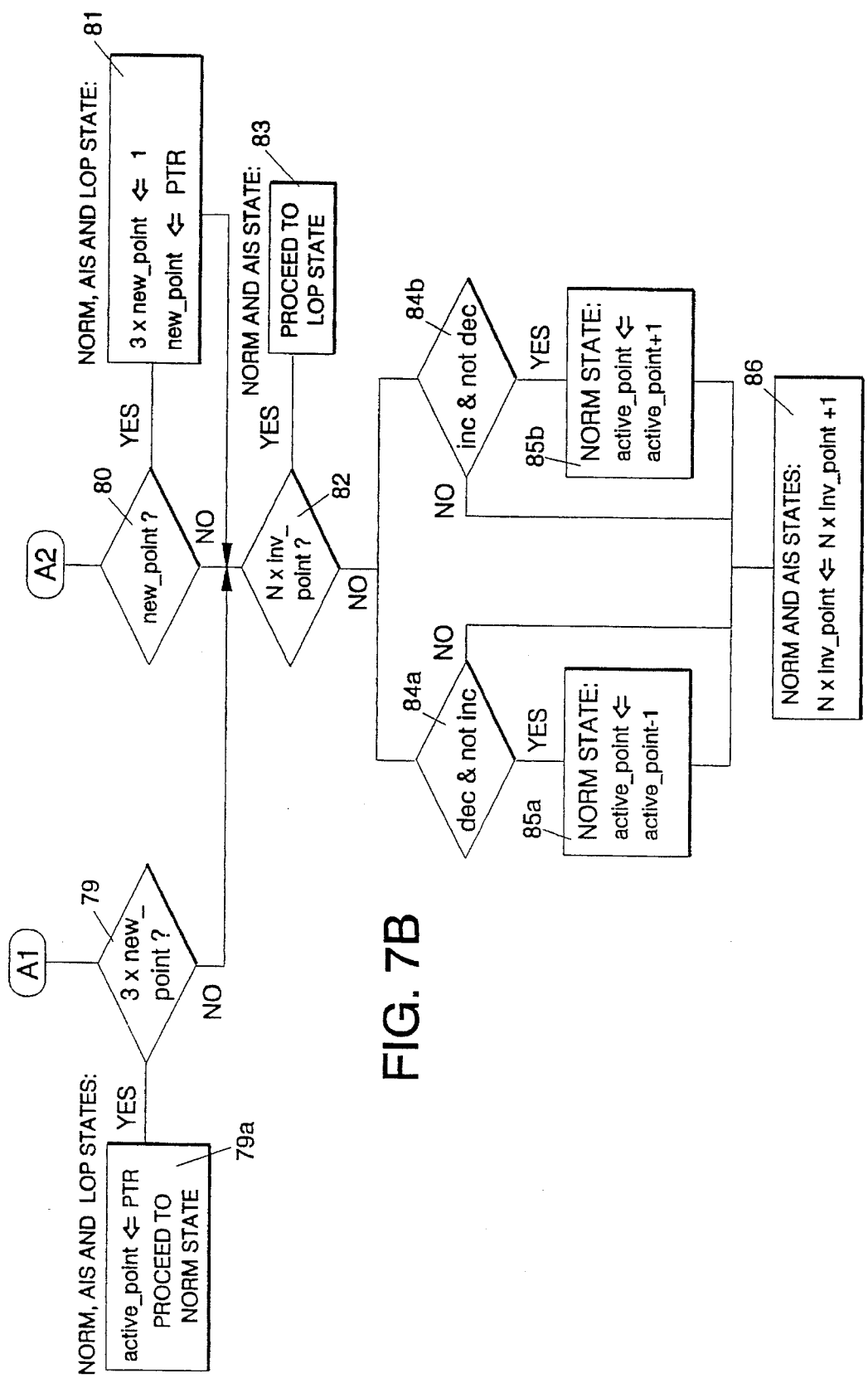

In the following, the pointer interpretation process is described in greater detail with reference to the corresponding parts of the flow diagram shown in FIGS. 7A and 7B.

At first the receiver receives a frame structure according to the SDH system, and the pointer data are extracted from the frame structure in a manner known per se (step 70).

1. In step 71, it is tested whether the above-mentioned 16-bit pointer word consists of ones only. If this is the case, the pointer value is interpreted as an AIS alarm (step 72).

In the NORM state, the active pointer is retained, and the alarm counter is incremented by one (3×AIS_ind←3×AIS_ind+1, step 73(a)). The NDF counter, the counter of the invalid pointer and that of the new pointer are reset. If the alarm counter reaches its upper limit (3), the alarm state (AIS) is proceeded to, and the alarm counter can be reset (step 73(b)).

No transition takes place in the AIS state. The alarm and NDF counters are not relevant, wherefore they can be reset. The counter of the new pointer and that of the invalid pointer are reset.

In the LOP state the alarm counter is incremented by one (3×AIS_ind←3×AIS_ind+1, step 73a), and the counter of the new pointer is reset. The counter of the invalid pointer and the NDF counter are not relevant, wherefore they can be reset. If the alarm counter reaches its upper limit, the alarm state (AIS) is proceeded to, and the alarm counter can be reset (step 73(b)).

Figure 1:
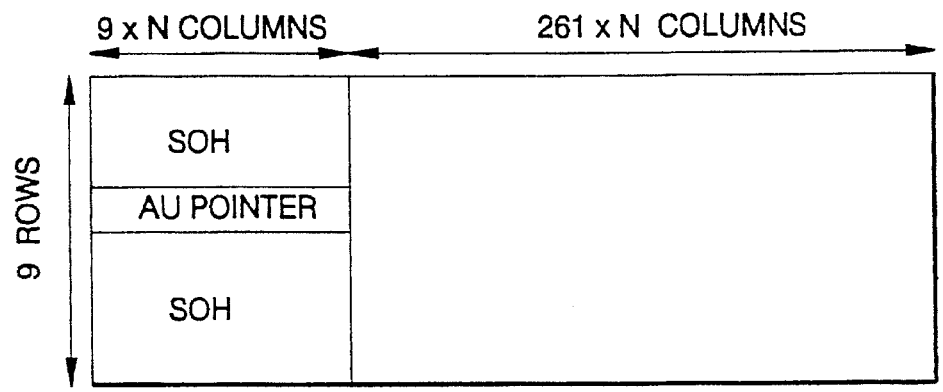
FIG. 1 shows the basic structure of a single STM-N frame.
Figure 2:
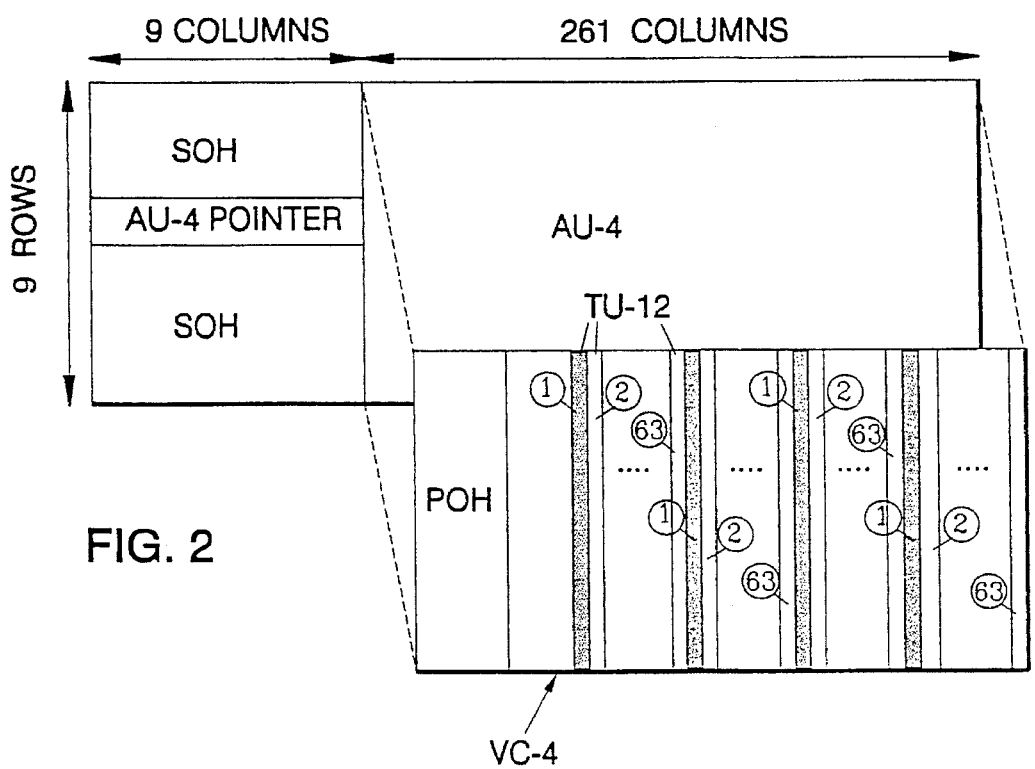
FIG. 2 shows the structure of a single STM-1 frame.
Figure 3:
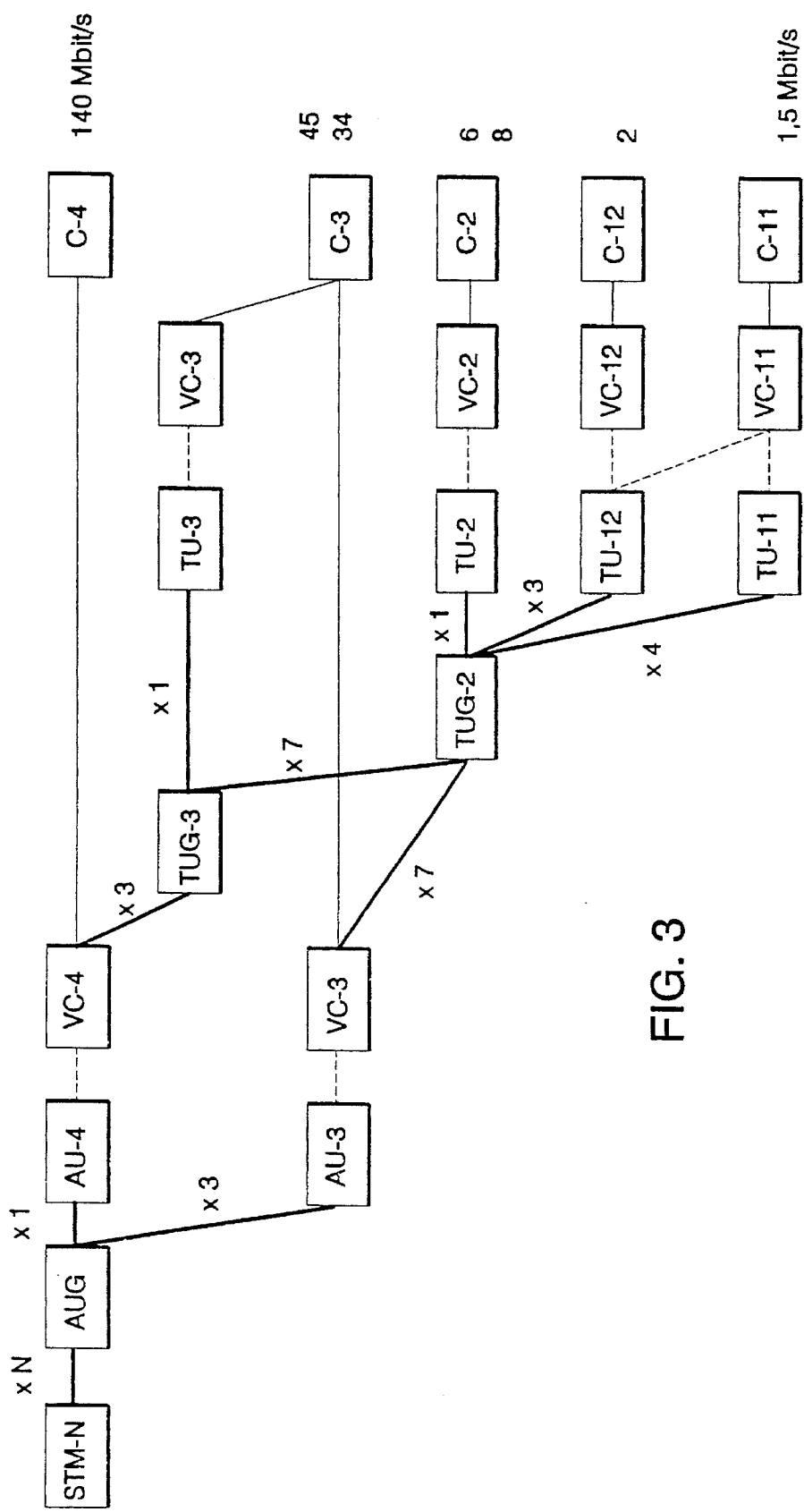
FIG. 3 shows the assembly of the STM-N frame from existing PCM systems.
Figure 4A:
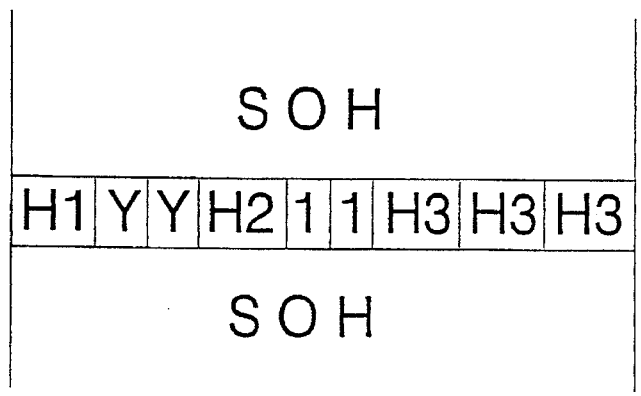
FIG. 4a shows the AU-4 pointer in greater detail.
Figure 4B:
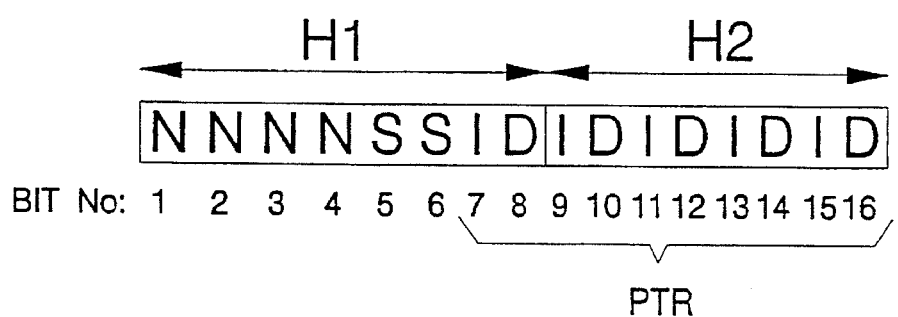
FIG. 4b shows the bytes H1 and H2 of the AU-4 pointer illustrated in FIG. 4a, FIG. 5 is a block diagram of an SDH cross-connect equipment in the synchronizing units of which the method of the invention can be employed.

2. The S-bits (FIG. 4b- bits 5 and 6) are verified only in step 71.

3. In step 74 the value of the new data flag (NDF) is verified. If said value NDF="1001" (the TU pointer is required to have full correspondence in the manner described above, and the AU pointer is required to have 3-bit correspondence, i.e. one of the values "1001", "1000", "1011", "1101" and "0001") and the 10- bit pointer value PTR is within the acceptable offset range, the event is interpreted as a new data flag (NDF_enable) (step 74(*a*)).

In the NORM state the NDF counter is in this case incremented by one (N×NDF_enable←N×NDF_enable+1, step 75(*a*)), and the counter of the new pointer, the alarm counter and the counter of the invalid pointer are reset. If the NDF counter reaches its upper limit (N), the LOP state is proceeded to, and the NDF counter is reset (step 75(*b*)). If the NDF counter has not reached its upper limit, the value of the active pointer is updated as the value of the new pointer (step 75(*c*)).

In the AIS state even a single NDF_enable event causes immediate transition to the NORM state. The new pointer becomes then the active pointer (step 75(*c*)), and all counters are reset.

In the LOP state, no transitions take place. The NDF counter and the counter of the invalid pointer are irrelevant, wherefore they can be reset. The counter of the new pointer and the alarm counter are reset as well.

4. If in step 74 the examined NDF word is one of the words included in the following tables, the situation is interpreted as normal (NDF_disabled), and the 10-bit pointer value PTR is interpreted according to the following subrules 4.1 to 4.2.3.

| AU–NDF | TU–NDF |
|---|---|
| 0000 | 0000 |
| 0010 | 0001 |
| 0011 | 0010 |
| 0100 | 0011 |
| 0101 | 0100 |
| 0110 (normal) | 0101 |
| 0111 | 0110 (normal) |
| 1010 | 0111 |
| 1100 | 1000 |
| 1110 | 1010 |
| 1111 | 1011 |
|  | 1100 |
|  | 1101 |
|  | 1110 |
|  | 1111 |

As can be seen from the table, in the case of a TU pointer all other values except "1001" are regarded as "normal" for the new data flag, and in the case of an AU pointer all other values except those which differ from the value "1001" with up to one bit.

4.1 This subrule is valid only in the NORM state, as the active pointer is undefined in the AIS and LOP states. In the case of the AIS or LOP states, subrule 4.2 is directly proceeded to.

If it is found out in the test carried out in step 76 that the 10-bit pointer value PTR is identical with the value of the active pointer, the event in question in the state diagram is an event concerning the active pointer, which is a normal event and, in practice, by far the commonest event. All counters described above are reset, but nothing else is changed (step 77).

4.2 If the 10-bit pointer value PTR differs from the value of the active pointer, or if the active pointer is undefined (AIS and LOP states), the following steps are taken:

4.2.1 If the pointer value is within the acceptable range, it is verified whether the same value was detected in the preceding pointer (step 78).

If the answer is positive, the counter of the new pointer is incremented by one (step 78*a*). Thereafter in step 79 (FIG. 7B), it is tested whether the counter of the new pointer has reached its upper limit (3). If this is the case, the NORM state is proceeded to, the value of the new pointer is accepted, and all counters are reset except for the counter of the invalid pointer. In the NORM state, this involves only a change in the offset value (step 79(*a*)).

If the answer is negative, the new pointer value is interpreted as having been received (step 80), and the counter of the new pointer is reset and incremented by one. The new pointer value is stored (step 81).

In the NORM state, the counter of the invalid pointer is incremented by one according to the invention, and the NDF counter and the alarm counter are reset. Thereafter in step 82 it is tested whether the counter of the invalid pointer has reached its upper limit (N). If this is the case, the LOP state is proceeded to, and the counter of the invalid pointer can be reset (step 83).

Likewise in the AIS state, the counter of the invalid pointer is incremented by one. The NDF counter and the alarm counter are irrelevant, wherefore they can be reset. If it is found out in step 82 that the counter of the invalid pointer has reached its upper limit, the LOP state is proceeded to, and the counter of the invalid pointer can be reset (step 83).

In the LOP state the alarm counter is reset. The counter of the invalid pointer and the NDF counter are irrelevant, wherefore they can be reset (not shown in the figure).

4.2.2 This subrule is valid only in the NORM state, as the value of the active pointer is undefined in the AIS and LOP states. In the case of the AIS or LOP state, item 5 is directly proceeded to.

If the majority (3, 4 or 5) of the five I-bits is inverted as compared with the active pointer, and the majority (3, 4 or 5) of the five D-bits is not inverted, it is interpreted according to the invention in step 84*b* that increment data (inc_ ind) is concerned, whereby the counter of the active pointer is incremented by one (step 85(*b*)). The NDF counter and the alarm counter are reset, and the counter of the invalid pointer is incremented by one (step 86). If the offset value is within the acceptable range, the counter of the new pointer is updated according to item 4.2.1 (NORM state), otherwise it is reset.

4.2.3 This subrule is valid only in the NORM state, as the value of the active pointer is undefined in the AIS and LOP states. In the case of the AIS or LOP state, item 5 is directly proceeded to.

If the majority (3, 4 or 5) of the five D-bits is inverted as compared with the active pointer, and the majority (3, 4 or 5) of the five I-bits is not inverted, it is interpreted according to the invention in step 84*a* that decrement data (dec_) is concerned, whereby the counter of the active pointer is decremented by one (step 85*a*). The NDF counter and the alarm counter are reset, and the counter of the invalid pointer is incremented by one (step 86). If the offset value is within the acceptable range, the counter of the new pointer is updated according to item 4.2.1 (NORM state), otherwise it is reset.

5. If none of items 1, 3 or 4 is valid, the pointer is interpreted as being invalid (inv_point).

In the NORM state the counter of the invalid pointer is incremented; the counter of the new pointer, the alarm counter, and the NDF counter are reset (step 86). If the counter of the invalid pointer reaches its upper limit (N), the LOP state is proceeded to, whereby said counter can be reset.

In the AIS state, the counter of the invalid pointer is incremented by one, and the counter of the new pointer is reset. The alarm counter and the NDF counter are irrelevant and can be reset. If the counter of the invalid pointer reaches its upper limit, the LOP state is proceeded to, and the counter can be reset.

In the LOP state there are no transitions. The counter of the new pointer and the alarm counter are reset. The counter of the invalid pointer and the NDF counter are irrelevant and can be reset.

6. In the case of the NORM state, increment data (inc__ ind), decrement data (dec__ind) and NDF__enable events are accepted, as stated above, every time they are detected, even if they occur successively. In the AIS state an NDF__enable event is accepted every time it is detected.

7. Concatenation is examined, and information concerning it is transmitted further, if necessary. In the interpretation of the pointer, concatenation is treated as an invalid pointer, which leads to transition to the LOP (loss of pointer) state if the concatenation information appears during a predetermined number (N) of frames.

The pointer interpretation process described is also disclosed in a co-pending FI patent application filed Jul. 1, 1992. This application relates more closely to the definition of invalid pointers in the main states of a receiver.

Even though the invention has been described above with reference to the examples shown in the attached drawings, it is obvious that the invention is not restricted to them but may be modified in various ways within the inventive idea disclosed above and in the accompanying claims. Even though SDH specific terms have been used above by way of example, the invention is equally applicable, e.g. in the corresponding American SONET system or in any other similar system in which the frame structure comprises a predetermined number of bytes of fixed length, and in which the frame structure comprises a pointer indicating the phase of the payload within the frame structure.

References:

[1] CCITT Blue Book, Recommendation G.709: "Synchronous Multiplexing Structure", May 1990.

[2] SDH - Ny digital hierarki, TELE 2/90.

[3] CCITT Blue Book, Recommendation G.783: "Characteristics of Synchronous Digital Hierarchy (SDH) Multiplexing Equipment Functional Blocks," August 1990, Annex B.

We claim:

1. A method for receiving a signal used in a synchronous digital telecommunication system, in which the signal has a frame structure including a predetermined number of bytes of fixed length and a pointer indicating the phase of payload within the frame structure, said method comprising:

performing pointer interpretation in which a receiver of said system has three possible main states, between which it undergoes transitions under the control of event counters, the main states being a normal state, a loss of pointer state and an alarm state, said counters counting predetermined events in each main state, said events comprising reception of decrement data indicating negative pointer justification, and reception of increment data indicating positive pointer justification, in the indication of which justifications increment and decrment bits included in the pointer are used, and reception of a new data flag indicating a new pointer value, wherein, in the normal state:
(a) all events in which a normal value for the new data flag is received, and a majority of the increment bits is inverted, and a majority of the decrement bits is not inverted are regarded as increment data, and
(b) all events in which a normal value for the new data flag is received, and a majority of the decrement bits is inverted, and a majority of the increment bits is not inverted are regarded as decrement data, and wherein the normal value for the new data flag is considered to be a predetermined bit sequence and values differing therefrom within certain limits.

2. A method according to claim 1, wherein:

said system is an SDH or SONET system; and said predetermined bit sequence is 0110, and in the case of a tributary unit pointer, all other values except 1001 are regarded as normal for the new data flag, and in the case of an administration unit pointer, all other values except those which differ from the value 1001 with up to one bit are regarded as normal for the new data flag.

* * * * *